(12) United States Patent
Ritschel et al.

(10) Patent No.: US 10,081,395 B2
(45) Date of Patent: Sep. 25, 2018

(54) INTERCONNECTION-TYPE VEHICLE BODY STRUCTURE

(71) Applicant: Bayerische Motoren Werke Aktiengesellschaft, Munich (DE)

(72) Inventors: Thomas Ritschel, Munich (DE); Franz-Peter Behrendt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/185,268

(22) Filed: Jun. 17, 2016

(65) Prior Publication Data

US 2016/0297479 A1   Oct. 13, 2016

Related U.S. Application Data

(63) Continuation of application No. PCT/EP2014/077498, filed on Dec. 12, 2014.

(30) Foreign Application Priority Data

Dec. 19, 2013   (DE) .................. 10 2013 226 607

(51) Int. Cl.
 *B62D 27/02*   (2006.01)
 *B62D 29/00*   (2006.01)
 (Continued)

(52) U.S. Cl.
 CPC .......... *B62D 27/023* (2013.01); *B62D 21/15* (2013.01); *B62D 25/025* (2013.01); *B62D 25/04* (2013.01);
 (Continued)

(58) Field of Classification Search
 CPC .... B62D 21/15; B62D 23/005; B62D 25/025; B62D 25/04; B62D 25/06; B62D 25/20;
 (Continued)

(56) References Cited

U.S. PATENT DOCUMENTS 6,010,182 A * 1/2000 Townsend .............. B62D 21/12
                                                  296/191
6,296,301 B1 * 10/2001 Schroeder ............ B62D 29/046
                                                  296/187.02
(Continued)

FOREIGN PATENT DOCUMENTS

DE    198 08 392 A1   3/1999
DE    201 12 357 U1   2/2002
(Continued)

OTHER PUBLICATIONS

English translation of DE 10 2012 016 666; retrieved Jul. 13, 2017 via PatentTranslate located at www.epo.org.*
(Continued)

*Primary Examiner* — Jason S Daniels
(74) *Attorney, Agent, or Firm* — Crowell & Moring LLP

(57) ABSTRACT

An interconnection-type vehicle body structure has at least two profiled frame parts made of fiber-reinforced composite material as well as an interconnecting element that joins the profiled frame parts to one another. The interconnecting element includes receptacles for the profiled frame parts. The interconnecting element is made from at least two sheet metal shells. The interconnecting element is not made of cast metal or of a fiber-reinforced composite material.

15 Claims, 1 Drawing Sheet

(51) Int. Cl.
*B62D 21/15* (2006.01)
*B62D 25/02* (2006.01)
*B62D 25/04* (2006.01)
*B62D 25/06* (2006.01)
*B62D 25/20* (2006.01)

(52) U.S. Cl.
CPC ............. *B62D 25/06* (2013.01); *B62D 25/20* (2013.01); *B62D 27/026* (2013.01); *B62D 29/005* (2013.01)

(58) Field of Classification Search
CPC ............. B62D 25/2009; B62D 25/2036; B62D 27/023; B62D 27/026; B62D 29/005
USPC ................................. 296/29, 30, 193.06, 205
See application file for complete search history.

(56) References Cited

U.S. PATENT DOCUMENTS

| | | | | |
|---|---|---|---|---|
| 6,389,697 | B1* | 5/2002 | Benoit | ................... B21D 26/14 |
| | | | | 219/617 |
| 2002/0050064 | A1 | 5/2002 | Furuse et al. | |
| 2007/0246972 | A1* | 10/2007 | Favaretto | ............. B62D 23/005 |
| | | | | 296/205 |
| 2008/0030050 | A1* | 2/2008 | Chen | ...................... B62D 25/06 |
| | | | | 296/210 |
| 2010/0186622 | A1 | 7/2010 | Cellghini et al. | |
| 2011/0158741 | A1* | 6/2011 | Knaebel | ................ B62D 23/005 |
| | | | | 403/265 |
| 2013/0175828 | A1* | 7/2013 | White | .................... B62D 25/04 |
| | | | | 296/203.03 |
| 2015/0183471 | A1* | 7/2015 | Faruque | ............... B62D 27/023 |
| | | | | 29/897.2 |

FOREIGN PATENT DOCUMENTS

| | | |
|---|---|---|
| DE | 10 2007 022 198 A1 | 11/2008 |
| DE | 10 2010 013 344 A1 | 10/2011 |
| DE | 10 2010 033 289 A1 | 2/2012 |
| DE | 10 2012 016 666 A1 | 1/2013 |
| WO | WO 2014/040832 A1 | 3/2014 |

OTHER PUBLICATIONS

International Search Report (PCT/ISA/210) issued in PCT Application No. PCT/EP2014/077498 dated Mar. 12, 2015, with English translation (six (6) pages).

German Search Report issued in counterpart German Application No. 10 2013 226 607.3 dated Sep. 26, 2014, with partial English translation (fifteen (15) pages).

* cited by examiner

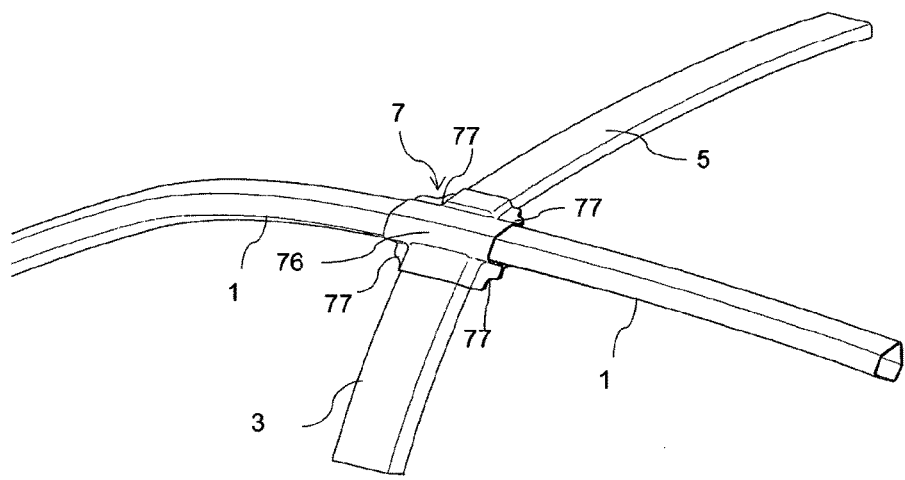
Fig. 1
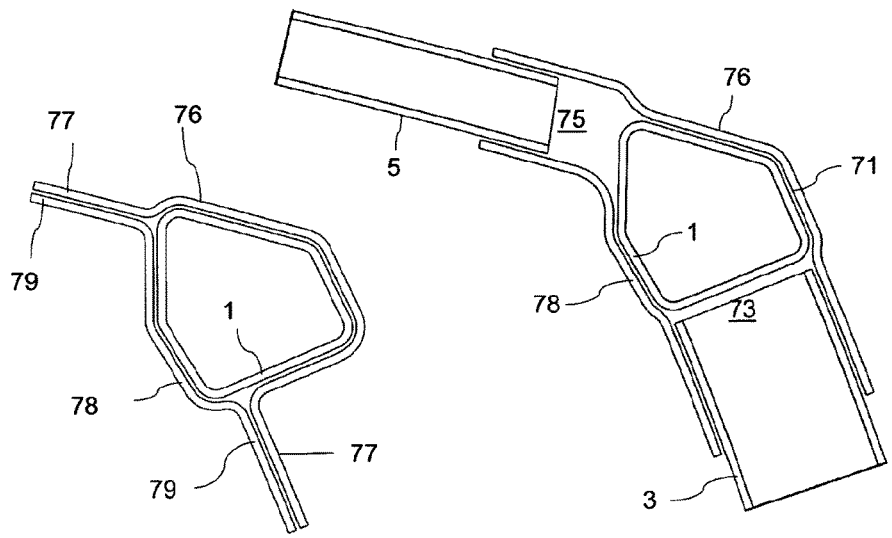
Fig. 3
Fig. 2

INTERCONNECTION-TYPE VEHICLE BODY STRUCTURE

CROSS REFERENCE TO RELATED APPLICATIONS

This application is a continuation of PCT International Application No. PCT/EP2014/077498, filed Dec. 12, 2014, which claims priority under 35 U.S.C. § 119 from German Patent Application No. 10 2013 226 607.3, filed Dec. 19, 2013, the entire disclosures of which are herein expressly incorporated by reference.

BACKGROUND AND SUMMARY OF THE INVENTION

The present invention relates to an interconnection-type vehicle body structure, particularly for a motor vehicle, having at least one interconnecting element that connects profiled frame parts to one another.

Body structures for motor vehicles are known which are made of an aluminum material and in which extruded sections are mutually connected by way of interconnecting elements consisting of die-castings. In addition, it is known in the case of a vehicle body structure to construct interconnecting parts and profiled parts connected thereto in a composite design, i.e. by means of elements consisting of different materials. For example, it is suggested in German Patent Document DE 19808392 A1 to mutually connect plastic profiles by use of cast light-metal interconnecting parts. Likewise, it is described in German Patent document DE 102010013344 A1 to construct a body shell, among others, by use of a supporting frame, that has so-called interconnecting devices, which are made of cast aluminum and connect profiles made of fiber-reinforced plastic material with one another. Known vehicle body structures are especially constructed with the goal of sufficient rigidity for a normal operation of a motor vehicle and with respect to occupant safety in the event of a collision.

It is an object of the present invention to provide an interconnection-type vehicle body structure that is light, can be produced more cost-effectively and nevertheless meets the demands on the vehicle body structure in the case of a collision load.

This and other objects are achieved by an interconnection-type vehicle body structure, particularly of a motor vehicle, having at least two profiled frame parts made of a fiber-reinforced composite material and an interconnecting element which mutually connects the profiled frame parts. The interconnecting element has receptacles for the profiled frame parts and is constructed of at least two sheet metal shells.

An interconnection-type vehicle body structure according to the present invention has at least two profiled frame parts made of a fiber-reinforced composite material and an interconnecting element which mutually connects the profiled frame parts. The interconnecting element has receptacles for the profiled frame parts. It is constructed of at least two sheet metal shells. The interconnecting element is therefore neither produced of a cast metal nor of a fiber-reinforced plastic material.

Sheet metal shells can be produced in a particularly cost-effective manner in large quantities. Especially in comparison with cast parts, sheet metal shells are more cost-effective, at least for simpler geometries. Because the interconnecting element is constructed of at least two parts, very stable three-dimensional interconnecting elements can be produced in the sheet metal shell construction. Likewise, the profiled frame parts can be produced comparatively cost-effectively from a fiber-reinforced plastic composite. This construction is also advantageous because the profiled frame parts made of fiber-reinforced composite material have the tendency to fail in a brittle manner after a slight elastic deformation, whereas interconnecting elements in a shell construction and of a metallic material can plastically deform in the case of overstraining. Despite the construction with profiled frame parts made of fiber-reinforced composite material, as a whole, this permits a greater plastic deformability of the vehicle body structure compared to a vehicle body structure whose interconnecting elements are also produced of fiber-reinforced composite material. Relative to weight, the vehicle body structure according to the invention has high rigidity for a normal operation of the vehicle body structure as well as high strength in the event of a collision load, in which case, by use of the interconnecting element made of at least two sheet metal shells, the probability of an occurrence of a sudden failure of the vehicle body structure and, particularly, of the profiled frame parts is reduced, for example, when they are strained by bending in the event of a collision load.

Sheet metal shells are especially three-dimensional elements which are produced, for example, by cold and/or warm forming of semi-finished sheet metal products.

The vehicle body structure, for example, is the vehicle body structure of a motor vehicle, particularly of a passenger car, which has to meet specific requirements in the event of a collision of the motor vehicle for protecting occupants of the motor vehicle.

In particular, a fiber-reinforced composite material is a plastic material reinforced by fibers. In other words, the fiber-reinforced composite material has a matrix made of plastic material, in which fibers are integrated for improving the strength characteristics of the plastic material.

The profiled frame part may be constructed of continuous fibers. The continuous fibers may previously have been prepared for forming a semi-finished fiber product by use of a braiding process or a winding process or by another method. In this case, the use of tri-axially braided continuous fibers is preferred. The fibers may be carbon fibers or other suitable fibers. The plastic matrix may be a duroplastic material, such as epoxide, as well as a thermoplastic material.

Naturally, an interconnection-type vehicle body structure may be constructed of a multiplicity of profiled frame parts and interconnecting element connecting the latter. In this case, all interacting elements and profiled frame parts can appropriately interact with respect to the stiffness and strength of the vehicle body structure.

Interconnecting elements may also be constructed of more than two sheet metal shells, which is advantageous, for example, in the case of a complex geometry that cannot be configured by use of two sheet metal shells.

According to a preferred further development, the interconnecting element is constructed such that, in the event of a collision of a motor vehicle having the vehicle body structure, it can be plastically deformed at a predetermined force.

The sheet metal shells advantageously each have a connecting flange by which the two sheet metal shells are mutually connected. In the case of more than two sheet metal shells of the interconnecting element, advantageously all sheet metal shells are mutually connected by flanges.

Connecting flanges permit a particularly simple connection of the sheet metal shells.

The sheet metal shells are preferably connected with one another in a frictional, interlocking and/or firmly bonded manner. Examples of such connections are welded connections, glued connections and bolted connections—screws or rivets—, which can also be arbitrarily combined with one another.

In particular, these connections are well suited for the connection of connection-forming flanges.

The connection of sheet metal shells can also easily be implemented in an automated manner.

According to a further development of the present invention, the profiled frame parts may be connected in a frictional, interlocking and/or firmly bonded manner, particularly by gluing and/or by a bolted connection with the pertaining receptacle of the interconnecting element.

According to an additional further development, one profiled frame part or both profiled frame parts may have a closed hollow profile; i.e. a cross-section of the hollow profile is closed transversely to its longitudinal dimension.

A closed hollow profile is advantageous with respect to bending stress in all directions of the profiled frame part and is therefore more stable with respect to an open profiled cross-section.

At least one receptacle is preferably designed such that it reaches around or encompasses an outer circumference of the pertaining profiled frame part; an outer circumference of a fastening section of the profiled frame part is preferably completely surrounded by the receptacle. The profiled frame part is therefore advantageously inserted with its fastening section into the receptacle.

Conversely, at least one receptacle may be designed such that it has a protrusion which the pertaining profiled frame part encompasses. In this case, this fits the profiled frame parts with its fastening section preferably onto the receptacle.

According to a further development, the profiled frame parts are vehicle body elements of a vehicle occupant compartment. A profiled frame part may preferably be a roof frame element or a roof side frame element. Furthermore, a profiled frame part may be a vehicle body pillar element. In addition, a profiled frame part may be a transverse roof bow element. Furthermore, a profiled roof part may be a side sill element. In addition or as an alternative, a profiled frame part may be a transverse floor bow element.

The entire vehicle occupant compartment or sections of the vehicle occupant compartment may be constructed of the vehicle body structure according to the invention.

According to a preferred embodiment, the interconnecting element connects three or four profiled frame parts with one another. The interconnecting element may, for example, mutually connect a roof pillar element, particularly a B-pillar, a roof frame or roof side frame and a transverse roof bow element.

The sheet metal shells are advantageously made of steel plates.

Steel plates can be formed particularly easily and cost-effectively and have an advantageous capability of plastically deforming and therefore have a certain ductility.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic perspective view of a vehicle body structure having an interconnecting element and profiled frame parts of a motor vehicle according to an embodiment of the present invention.

FIG. 2 is a schematic sectional view of the interconnecting element with the profiled frame parts according to the embodiment of the present invention.

FIG. 3 is another schematic sectional view of the intersecting element according to the embodiment of the present invention.

DETAILED DESCRIPTION OF THE DRAWINGS

In the following, an embodiment of the present invention is described with reference to FIGS. 1 to 3.

In a schematic perspective view, FIG. 1 illustrates a vehicle body structure having an interconnecting element 7 as well as a roof side frame element or roof frame element 1, a B-pillar element 3 and a transverse roof bow element 5 as profiled frame parts according to the present invention. In particular, the illustrated vehicle body structure is a segment of a vehicle occupant compartment of a passenger car.

FIG. 2 is a sectional view of the interconnecting element 7 along the longitudinal axes of the B-pillar element 3 and of the transverse roof bow element 5 and transversely through the roof side frame element 1. Essentially parallel to the sectional plane of FIG. 2, FIG. 3 is a sectional view of the interconnecting element 7 and transversely with respect to the roof side frame element 1. As illustrated in the sectional views of FIGS. 2 and 3, the interconnecting element 7 is constructed of exactly two steel plate shells 76, 78 fastened to one another. Furthermore, the interconnecting element 7 has a receptacle 71 for receiving the roof side frame element 1, a receptacle 73 for receiving the B-column element 3 and a receptacle 75 for receiving the transverse roof bow element 5. The sheet metal shell 76 has a total of four connecting flanges 77 (as illustrated in FIG. 1) between the receptacles 71, 73, 75. In addition, the sheet metal shell 78 correspondingly has four connecting flanges 79 between the receptacles 71, 73, 75. In a suitable manner, the connecting flanges 77 are connected by welding and/or gluing with the opposite connecting flanges 79, so that the sheet metal shells 76, 78 are connected with one another and form the interconnecting element 7.

As illustrated in FIGS. 2 and 3, the roof side frame element 1 has a closed hollow profile in a sectional view transversely to its longitudinal axis. Likewise, the B-column element 3 and the transverse roof bow element 5 have a closed profile in a sectional view transversely to their longitudinal axes.

All profiled frame parts according to the embodiment consist of a fiber-reinforced composite material which contains, for example, braided or wound or otherwise arranged continuous fibers made of carbon. However, one of the profiled frame parts may also be constructed of a metallic material, according to the invention, the interconnecting element mutually connecting at least two profiled frame parts made of a fiber-reinforced composite material.

The transverse roof bow element 1 is fitted through the receptacle 71 of the interconnecting element 7, a center section of the transverse roof bow element 1 being connected with the receptacle 71 of the interconnecting element 7 at least by way of gluing. Furthermore, an end section of the B-column element 3 is fitted into the receptacle 73 and is connected with the latter at least by way of gluing. In addition, an end section of the transverse roof bow element 5 is fitted into the receptacle 75 and connected with the latter at least by way of gluing. As an alternative or in addition, other forms of connections between the elements can be used.

The interconnecting element 7 is constructed by the steel plate shells 76, 78 such that, in the event of a lateral collision of a motor vehicle having the vehicle body structure, i.e. when a collision opponent, for example, impacts on a B-column having the column element 3, it can be plastically deformed in the event of a predefined force. Thus, a deformation of the B-column becomes possible particularly by a plastic deformation of the interconnecting element, in which case, the column element 3 itself is slightly deformed, and a brittle failure and thereby a breaking of the B-column element 3 by a bending load is prevented up to a predefined collision load.

According to the invention, the interconnecting element 7 is constructed of steel plate shells 76 and 78 and is not formed from a casting. This permits a particularly cost-effective production of the interconnecting element 7, in which case, the requirements of sufficient ductility of the interconnecting element 7 can be met in the event of a collision load. The profiled frame parts 1, 3, 5 made of fiber-reinforced composite material achieve a particularly light construction of the vehicle body structure while the strength and stiffness are high.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body structure, comprising:
   at least two profiled frame parts made of fiber-reinforced composite material;
   an interconnecting element configured to mutually connect the at least two profiled frame parts, wherein the interconnecting element comprises at least two sheet metal shells, the at least two sheet metal shells together form receptacles for the at least two profiled frame parts.

2. The vehicle body structure according to claim 1, wherein the vehicle body structure is of a motor vehicle.

3. The vehicle body structure according to claim 2, wherein the interconnecting element is formed such that, in an event of a collision of the motor vehicle having the vehicle body structure, the interconnecting element is plastically deformable at a predefined force.

4. The vehicle body structure according to claim 1, wherein each of the at least two sheet metal shells have a connecting flange by which the two sheet metal shells are mutually connected.

5. The vehicle body structure according to claim 4, wherein the mutual connection is one or more of a frictional, form-locking or firmly bonded connection.

6. The vehicle body structure according to claim 5, wherein the mutual connection comprises a welded, glued and/or bolted connection.

7. The vehicle body structure according to claim 1, wherein the profiled frame parts are one or more of frictionally, form-lockingly or firmly-bonded to an associated receptacle of the interconnecting element.

8. The vehicle body structure according to claim 1, wherein one or both of the at least two profiled frame parts have a closed hollow profile.

9. The vehicle body structure according to claim 1, wherein at least one receptacle of the interconnecting element is configured to extend around an outer circumference of an associated one of the at least two profiled frame parts.

10. The vehicle body structure according to claim 9, wherein at least one receptacle of the interconnecting element is configured with a protrusion that is encompassed by an associated one of the profiled frame parts.

11. The vehicle body structure according to claim 1, wherein at least one receptacle of the interconnecting element is configured with a protrusion that is encompassed by an associated one of the profiled frame parts.

12. The vehicle body structure according to claim 1, wherein the profiled frame parts comprise vehicle body components of a vehicle occupant compartment.

13. The vehicle body structure according to claim 12, wherein the profiled frame parts comprise one or more of a roof side frame component, a vehicle body pillar component, a transverse roof bow component, a side sill component or a transverse floor bow component.

14. The vehicle body structure according to claim 1, wherein the interconnecting element comprises three or four receptacles for connecting three or four profiled frame parts.

15. The vehicle body structure according to claim 1, wherein the at least two sheet metal shells are constructed of deformed steel plates.

* * * * *